United States Patent
Albrecht et al.

(10) Patent No.: US 9,273,884 B2
(45) Date of Patent: Mar. 1, 2016

(54) FREEZE PROTECTION SYSTEM FOR SOLAR RECEIVER

(71) Applicant: Babcock & Wilcox Power Generation Group, Inc., Barberton, OH (US)

(72) Inventors: Melvin J Albrecht, Homeworth, OH (US); Jason M Marshall, Wadsworth, OH (US); Justin A Persinger, Norton, OH (US); Thanneeru D Rao, Copley, OH (US); David T Wasyluk, Mogadore, OH (US); Andrew G Heap, Pasadena, CA (US); Phani Meduri, Mountain View, CA (US); James E Pacheco, Sierra Madre, CA (US); Gaurav Soni, Pasadena, CA (US)

(73) Assignee: The Babcock & Wilcox Company, Barberton, OH (US)

( * ) Notice: Subject to any disclaimer, the term of this patent is extended or adjusted under 35 U.S.C. 154(b) by 531 days.

(21) Appl. No.: 13/677,499

(22) Filed: Nov. 15, 2012

(65) Prior Publication Data

US 2013/0118477 A1 May 16, 2013

Related U.S. Application Data

(60) Provisional application No. 61/560,538, filed on Nov. 16, 2011.

(51) Int. Cl.
*F24J 2/42* (2006.01)
*F24J 2/46* (2006.01)
(Continued)

(52) U.S. Cl.
CPC ............... *F24J 2/4632* (2013.01); *F22B 1/006* (2013.01); *F22B 21/04* (2013.01); *F22B 37/42* (2013.01); *F24J 2/04* (2013.01); *F24J 2/07* (2013.01); *F24J 2/402* (2013.01); *Y02E 10/41* (2013.01)

(58) Field of Classification Search
USPC ......................................... 126/609, 646, 680
See application file for complete search history.

(56) References Cited

U.S. PATENT DOCUMENTS 4,061,267 A * 12/1977 Lof ............................... 126/586
4,064,868 A    12/1977 Nussbaum
(Continued)

FOREIGN PATENT DOCUMENTS

EP            1130330 A2     9/2001

OTHER PUBLICATIONS

International Preliminary Report on Patentability for corresponding PCT Application No. PCT/US2012/065246.
(Continued)

*Primary Examiner* — Avinash Savani
(74) *Attorney, Agent, or Firm* — Eric Marich

(57) ABSTRACT

A solar receiver has an arrangement of heat transfer surfaces and a heat transfer fluid phase separator, such as a vertical steam/water separator, fluidly interconnected thereto. The receiver includes a plurality of heat transfer fluid filled components, and at least one alternate heat source. When various temperature measurements indicate freezing or solidification of the fluid is possible, the alternate heat source is activated to maintain a temperature of the fluid greater than the freezing/solidification point of the fluid. The application of the alternate heat source further induces natural circulation of the fluid within the components, further providing freeze/solidification protection to the receiver. A controller may be configured to receive sensed temperatures of the fluid, components, ambient air, etc., and use these temperatures relative to a threshold temperature to activate, vary output, and deactivate one or more alternate heat sources.

32 Claims, 13 Drawing Sheets

(51) Int. Cl.
*F24J 2/04* (2006.01)
*F22B 1/00* (2006.01)
*F24J 2/07* (2006.01)
*F24J 2/40* (2006.01)
*F22B 21/04* (2006.01)
*F22B 37/42* (2006.01)

(56) References Cited

U.S. PATENT DOCUMENTS

| | | | | |
|---|---|---|---|---|
| 4,143,705 | A | * | 3/1979 | Awalt, Jr. .................. 165/48.2 |
| 4,157,706 | A | | 6/1979 | Gaskill |
| 4,207,866 | A | * | 6/1980 | Boyd ............................ 126/588 |
| 4,237,862 | A | * | 12/1980 | Embree ........................ 126/588 |
| 4,800,727 | A | * | 1/1989 | Petrick ............................ 60/649 |
| 2007/0157922 | A1 | * | 7/2007 | Radhakrishnan et al. .... 126/609 |
| 2010/0101564 | A1 | | 4/2010 | Iannacchione et al. |
| 2010/0258112 | A1 | | 10/2010 | Viskup, Jr. et al. |

OTHER PUBLICATIONS

International Search Report for corresponding PCT Application No. PCT/US2012/065246.

* cited by examiner

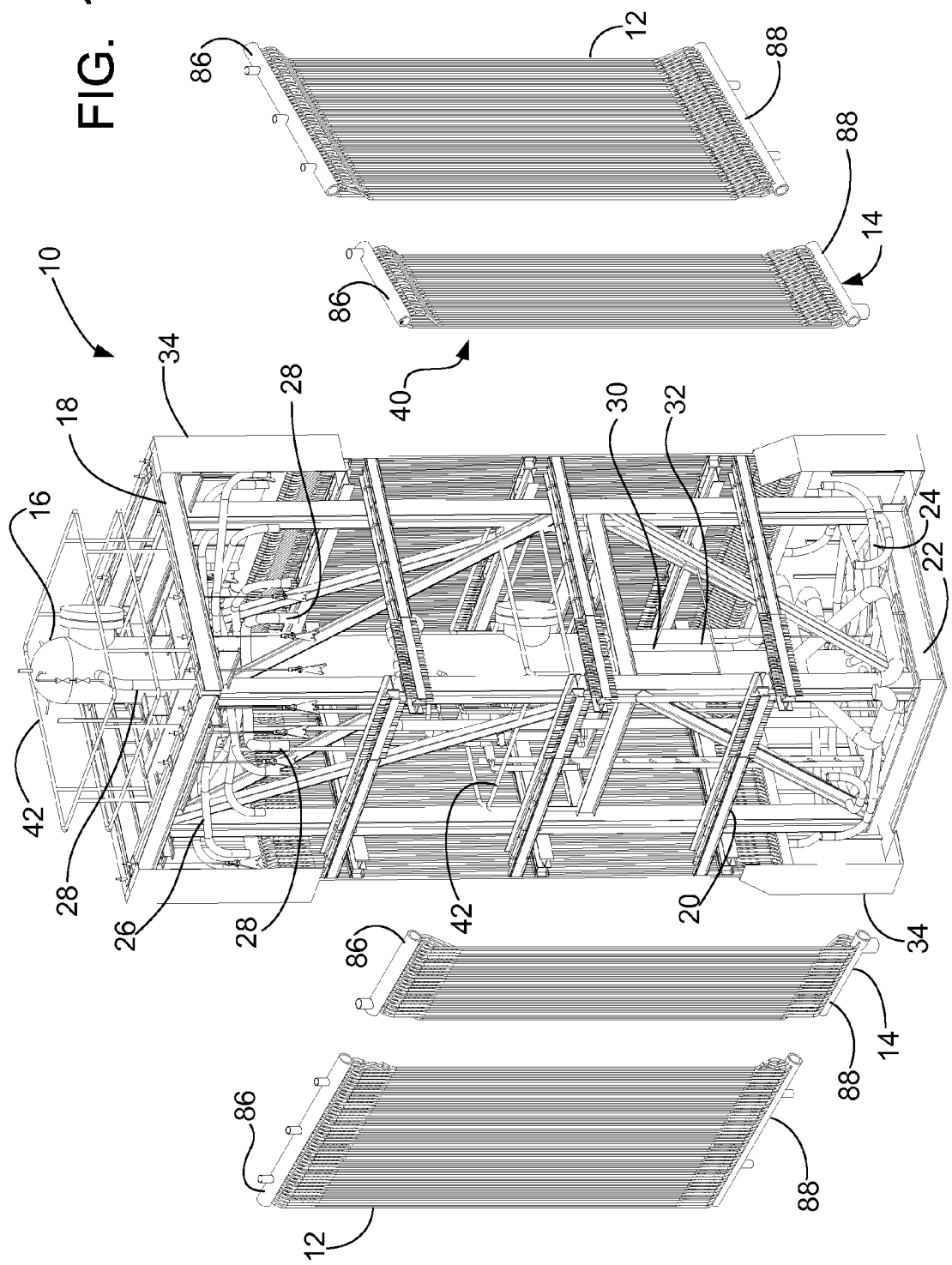

Freeze Protection Via Heat Source Located On Outside of Downcomer

Freeze Protection Via Heat Source Located Inside of Downcomer

Freeze Protection Via Heat Source Located On Outside of Vertical Separator

Freeze Protection Via Heat Source Located On Inside of Vertical Separator

Freeze Protection Via Heat Source Located On Outside of Lower Header

Freeze Protection Via Heat Source Located Inside of Lower Header

Freeze Protection Via Heat Source Located On Outside of Supply

Freeze Protection Via Heat Source Located On Inside of Supply

Freeze Protection Via Heat Source in Contact With Evaporator Panel Tubes

FREEZE PROTECTION SYSTEM FOR SOLAR RECEIVER

This application claims priority to U.S. Provisional Patent Application Ser. No. 61/560,538, filed on Nov. 16, 2011. The disclosure of this application is hereby fully incorporated by reference in its entirety.

BACKGROUND

The present disclosure relates, in general, to the field of solar power generation. More particularly, the present disclosure is directed to the protection or inhibition of freezing or solidification of a heat transfer fluid in a solar receiver.

A solar receiver is a primary component of a solar energy generation system whereby sunlight is used as a heat source for the eventual production of superheated high quality steam that is used to turn a turbine generator, and ultimately produce electricity using the Rankine cycle or provide steam for other thermal processes.

Generally, the solar receiver is positioned on top of an elevated support tower which rises above a ground level or grade. The solar receiver is strategically positioned in an array of reflective surfaces, such as a field of heliostats (or mirrors), that collect rays of sunlight and redirect or reflect those rays to the heat absorbing surfaces of the solar receiver. This solar energy is then absorbed by the working heat transfer fluid (HTF) flowing through the solar receiver. The reflective surfaces may be oriented in different positions through the day to track the sun and maximize reflected sunlight to the heat absorbing surfaces.

The solar receiver is an assembly of tubes with water, steam, molten salts, or other heat transfer fluid (HTF) flowing inside the tubes. The HTF inside the tubes of the receiver absorbs the concentrated solar energy, causing the HTF to increase in temperature and/or change phases, so that the HTF captures the solar energy. The heated HTF is then either directly routed to a turbine generator to generate electrical power or is indirectly routed to a storage tank for later use.

A common problem in solar receivers relates to temperature drops that occur during periods of solar inactivity, e.g., dense/continuous cloud cover, nightfall, and the like. During periods where solar activity, e.g., heat, is noticeably absent, the temperature of the heat transfer fluid may drop to temperatures that approach or fall below freezing/solidification. Such periods can occur in varying climates, including desert environments, where concentrated solar power (CSP) plants are primarily located. When using water as a heat transfer fluid, freezing of the fluid within the receiver may occur as external temperatures drop (e.g. winter) and offsetting heat from the sun is unavailable. The evaporator tube panels, which are filled with water, are exposed to ambient conditions and are particularly in danger of freezing. If the receiver is not drained, the heat transfer fluid will expand and could rupture the tube(s).

Current preventive measures include draining the heat transfer fluid from the solar receiver so as to prevent damage to components of the solar receiver caused by freezing. These measures are not practical for commercial plants. There are also other disadvantages, including wasting the drained heat transfer fluid and chemicals, consumption of nitrogen (to displace air for corrosion control) which increases operating costs, the time needed to refill the solar receiver and the resulting increase in startup time (and decreased availability), and the discarding of thermal energy in the heat transfer fluid contained in the steam drum or vertical separator (discussed later). In addition, the receiver is at risk for scaling and corrosion during the time period required to get the water quality back to the proper chemistry. For these reasons, it would be advantageous to leave the solar receiver full of HTF.

Electrical trace heating is a system used to maintain or raise the temperature of some instrument tubing and small bore piping. Generally, an electrical heating element is run in thermal contact along the length of a pipe, and the pipe is then covered with thermal insulation to retain heat losses from the pipe. However, it is not practical or cost-effective to heat trace all of the water-filled solar receiver panel tubes due to their large quantity and small size. For example, there could be several hundred evaporator tubes in a solar receiver. Additionally, there is also a need for a control system for monitoring and activating a freeze/solidification protection system to reduce or prevent damage and enhance the efficiency of a solar receiver.

BRIEF DESCRIPTION

The present disclosure provides a freeze protection system for a solar receiver. The receiver is equipped with at least one alternate heat source that is capable of generating movement and temperature increases in the heat transfer fluid inside the solar receiver so as to prevent the freezing of the fluid. A controller is included to control the alternate heat source.

Disclosed in various embodiments herein is a steam/water solar receiver, comprising at least one tube panel, a steam separation device, a downcomer, and at least one alternate heat source. The at least one tube panel comprises a plurality of vertical tubes for conveying a heat transfer fluid. The tubes are interconnected by at least one upper header and at least one lower header. The steam separation device is fluidly connected to the at least one upper header of the at least one evaporator tube panel. The downcomer is fluidly coupled to the steam separation device and the at least one lower header of the at least one evaporator tube panel. The at least one alternate heat source is selectively operative on a heat transfer fluid within the solar receiver.

The at least one alternate heat source may be configured to heat the heat transfer fluid so as to induce a natural circulation flow through the solar receiver.

The at least one alternate heat source can be positioned so as to contact an outside portion of the at least one lower header or can be positioned within the at least one lower header. Alternatively, the at least one alternate heat source can be positioned so as to contact an outside portion of the downcomer or can be positioned within the downcomer. The at least one alternate heat source may be an electric band heater or a steam sparger.

The solar receiver may further comprise at least one temperature sensor for sensing a temperature of the heat transfer fluid; or may alternatively further comprise a controller configured to control the at least one alternate heat source.

The controller can be configured to receive the sensed temperature of the heat transfer fluid and selectively operate the at least one alternate heat source in response thereto. Alternatively, the controller can be configured to compare the sensed temperature to a preselected threshold temperature, such that the at least one alternate heat source is activated upon the sensed temperature meeting the preselected threshold temperature.

Sometimes, the at least one alternate heat source can be positioned to contact an outside portion of at least one of the tubes. Other times, the at least one alternate heat source can be positioned so as to contact an outside portion of a supply pipe fluidly connecting the lower header with the downcomer, or can be positioned within the supply pipe.

The steam separation device may be a steam drum or a vertical separator. The at least one alternate heat source can be positioned so as to contact an outside portion of a base of the vertical separator, or can be positioned within the base of the vertical separator.

The solar receiver may further comprise an isolation valve above a level at which the steam separation device is fluidly connected to the upper header. The isolation valve can be located in the saturated connection piping between the steam separation device and the tube panel(s).

Also disclosed in various embodiments is a solar receiver comprising: at least one tube panel comprising a plurality of vertical tubes for conveying a heat transfer fluid, wherein the tubes are interconnected by at least one upper header and at least one lower header; a vertical separator; a downcomer in fluid communication with the vertical separator; at least one riser fluidly connecting the at least one upper header and the vertical separator; at least one supply pipe fluidly connecting the at least one lower header and the downcomer; and at least one alternate heat source in contact with the downcomer, the at least one lower header, or the at least one tube panel, the at least one alternate heat source configured to heat the associated heat transfer fluid contained in the solar receiver.

The solar receiver may further comprise at least one temperature sensor in contact with the heat transfer fluid, ambient air surrounding the solar receiver, the vertical separator, the downcomer, the at least one tube panel, the at least one riser, or the at least one supply pipe.

The solar receiver may further comprise a controller including one or more processors in communication with the at least one temperature sensor and the alternate heat source. The controller can be configured to receive temperature information from the at least one temperature sensor, and operate the at least one alternate heat source in response to received temperature information. The controller can be further configured to compare received temperature information to at least one preselected threshold temperature, and wherein the at least one alternate heat source is activated in response to an output of such comparison.

The at least one alternate heat source may be a variable heat source or a constant heat source. Sometimes, the at least one alternate heat source is configured to apply a selected amount of thermal energy to the associated heat transfer fluid so as to induce circulation of the heat transfer fluid in the solar receiver. Other times, the at least one alternate heat source is in contact with the downcomer such that the induced circulation is a natural circulation of the associated heat transfer fluid.

In some embodiments, the solar receiver further comprises a circulation pump fluidly coupled to the downcomer, the at least one lower header, or the at least one upper header.

Also disclosed in various embodiments herein is a solar energy generation system, comprising: a solar receiver comprising a plurality of fluid-filled components; and at least one alternate heat source in contact with at least a portion of at least one of the fluid-filled components of the solar receiver.

The solar energy generation system may further comprise a controller in communication with the at least one alternate heat source, the controller configured to control operations of the alternate heat source.

The solar energy generation system may further comprise at least one fluid temperature sensor in data communication with the controller, the at least one heat transfer fluid temperature sensor configured to detect a temperature of an associated heat transfer fluid within the solar receiver.

The solar energy generation system may further comprise at least one ambient air temperature sensor in data communication with the controller, the at least one ambient air temperature sensor configured to detect a temperature of ambient air surrounding the solar energy generation system.

The solar energy generation system may further comprise at least one component temperature sensor in data communication with the controller, the at least one component temperature sensor configured to detect a temperature of at least one component of the solar receiver.

The controller can be configured to receive fluid temperature information from the at least one fluid temperature sensor, ambient air temperature information from the at least one ambient air temperature sensor, and component temperature information from the at least one component temperature sensor. The controller may be further configured to compare at least one of the received temperature information to a preselected threshold temperature, and wherein the controller activates the at least one alternate heat source in accordance with a result of the comparison.

The plurality of fluid-filled components may include a vertical separator, at least one riser, at least one evaporator tube panel, at least one supply, and a downcomer. The solar energy generation system may further comprise a circulation pump configured to circulate the associated heat transfer fluid in the solar energy generation system. The controller can be operative to activate the circulation pump in accordance with a result of the threshold temperature comparison. The solar receiver may include an isolation valve above a water level of the vertical separator.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 1 is an exploded perspective isometric view of an exemplary embodiment of a solar receiver, illustrating the arrangement of heat transfer surfaces, a vertical steam/water separator structurally and fluidly interconnected thereto; and a vertical support structure provided to top support the vertical separator and the heat transfer surfaces.

DETAILED DESCRIPTION

Figures 2A, 2B:
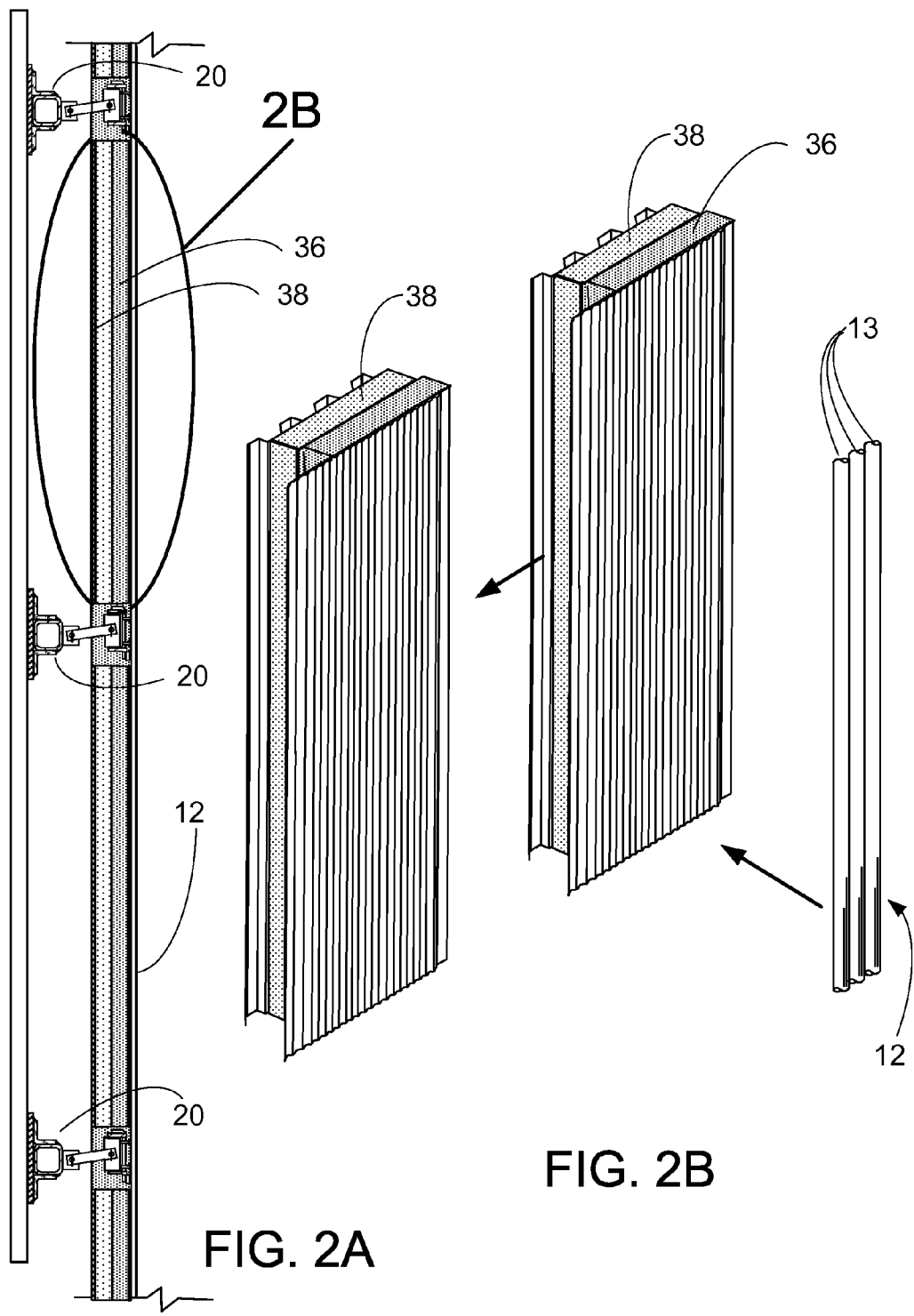
FIG. 2A is a side cross-sectional view of a tube panel with a light barrier and insulation.
FIG. 2B is a perspective view of the panel of FIG. 2A.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

It should be noted that many of the terms used herein are relative terms. For example, the terms "interior", "exterior", "inward", and "outward" are relative to a center, and should not be construed as requiring a particular orientation or location of the structure. Similarly, the terms "upper" and "lower" are relative to each other in location, i.e. an upper component is located at a higher elevation than a lower component.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other.

The solar receiver described in various embodiments herein employs, for exemplary purposes, a vertical steam/water separating device according to the teachings of U.S. Pat. No. 6,336,429 to Wiener to separate the steam from the steam-water mixture produced by the solar receiver of the present disclosure. The entirety of U.S. Pat. No. 6,336,429 to Wiener is hereby fully incorporated by reference herein. The vertical steam/water separator is structurally and fluidly interconnected with the heating surfaces of the solar receiver.

To the extent that explanations of certain terminology or principles of the heat exchanger, boiler and/or steam generator arts may be necessary to understand the present disclosure, the reader is referred to *Steam/its generation and use,* 40th Edition, Stultz and Kitto, Eds., Copyright©1992, The Babcock & Wilcox Company, and to *Steam/its generation and use,* 41st Edition, Kitto and Stultz, Eds., Copyright©2005, The Babcock & Wilcox Company, the texts of which are hereby fully incorporated by reference herein.

The receiver is an assembly of tubes with molten salts or other heat transfer fluid (HTF) flowing inside the tubes. At grade, a field of mirrors called heliostats track the sun's movement and focus sunlight onto the heat transfer surfaces of the receiver. The HTF inside the tubes of the receiver absorbs the concentrated solar energy, causing the HTF to increase in temperature and/or change phases, so that the HTF captures the solar energy.

The solar receiver of the present disclosure is advantageously comprised of an arrangement of heat transfer surfaces and fluid conveying conduits (pipes, valves, etc.) and associated controls arranged in a particular fashion to transfer a desired amount of heat energy into the heat transfer fluid. The heat transfer surfaces are advantageously made of tubes arranged into tangent tube panels, and are provided with inlet and outlet headers as required. As is known to those skilled in the art, the sizes of tubes, their material, diameter, wall thickness, number and arrangement for the heat transfer surfaces are based upon temperature and pressure for service, according to applicable design codes. Required heat transfer characteristics, circulation ratios, spot absorption rates, mass flow rates of the working fluid within the tubes, etc. are also important parameters which must be considered. Depending upon the geographic location where the solar receiver is to be installed, applicable seismic loads and design codes are also considered.

Figure 3:
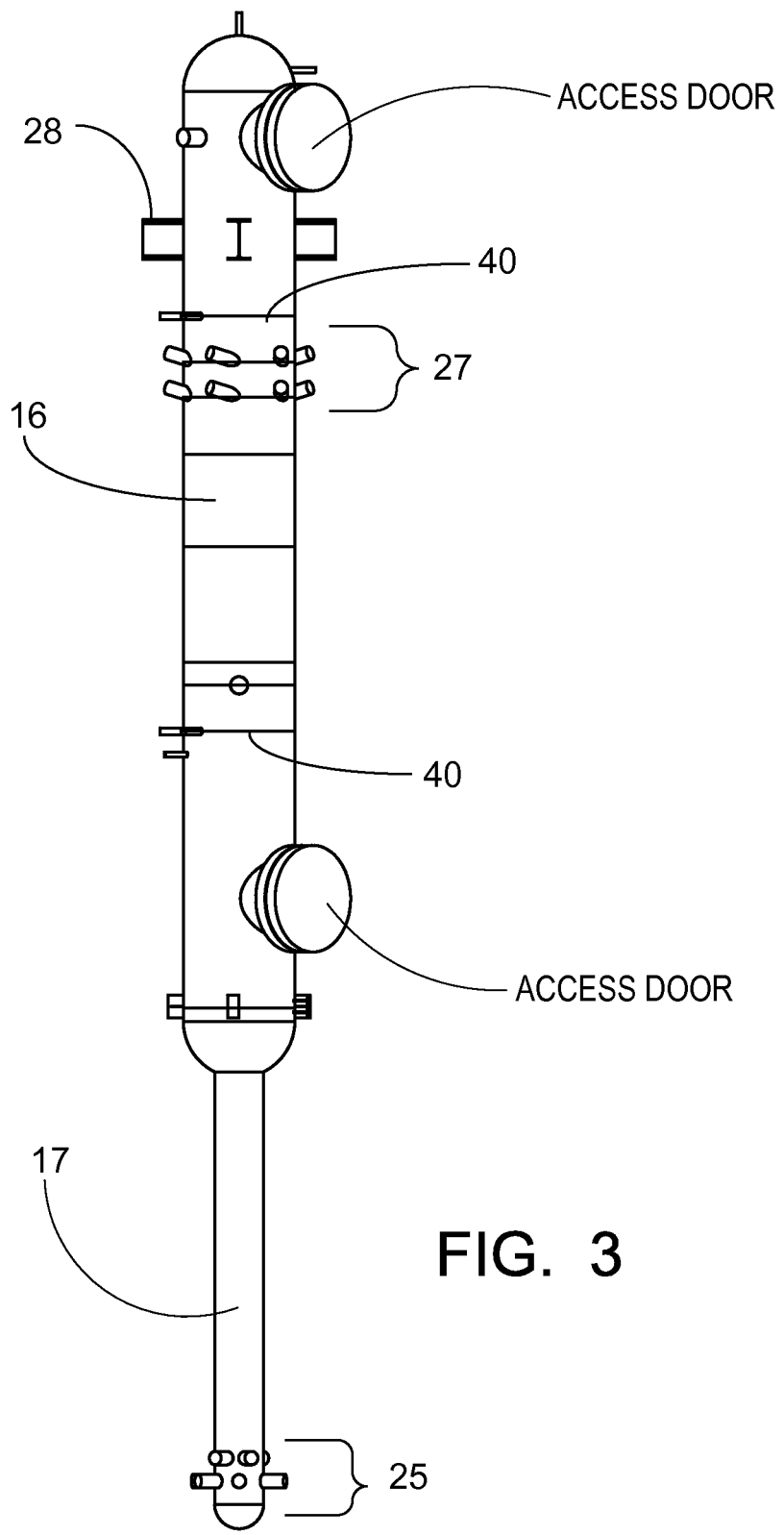
FIG. 3 is a view of the vertical steam/water separator, illustrating various connections thereto.

Referring to FIGS. 1-3, there is shown a solar receiver 10 according to present disclosure, and which is comprised of the following major components:

Evaporator or boiler tube panels 12;
Primary superheater (PSH) and secondary superheater (SSH) tube panels 14;
A vertical steam/water separator 16;
A downcomer 17;
Vertical, internal support structure 18, buckstays 20, and tower connection 22;
Supply pipes 24, risers 26 and saturated connection piping 28;
Spray water attemperator 30 and piping 32;
Header heat shields 34;
Light barrier 36 and insulation 38;
Instrumentation 40;
Platforms 42 and access ladders; and
Upper headers 86 and Lower headers 88.

The present disclosure relates to improved methods of freeze protection for solar receivers 10, particularly when the solar receiver 10 is a steam/water receiver. Unlike current freeze protection methods involving the draining of the heat transfer fluid 98, the present disclosure achieves heat transfer fluid 98 movement in the solar receiver 10 by means of at least one strategically placed alternate heat source(s) 90 that is attached to the outside of fluid bearing components or within such components.

The alternate heat source more specifically is an artificial heat source. The term "artificial" refers to the ability to control whether heat is applied or generated by the alternate heat source at a desired time period. For example, sunlight should not be considered an alternate heat source because it cannot be applied during the nighttime.

The alternate heat source 90 is advantageously controlled, via the controller 96, to activate once the components cool to a set temperature that is close to, but above, the freezing point of the heat transfer fluid. Dependent upon ambient conditions, more or less energy may be required in order to maintain fluid temperatures above freezing, so the energy output by the alternate heat source 90 may be variable and controlled in order to hold metal and fluid temperatures correspondingly above the freezing temperature of the heat transfer fluid. Suitable examples of such alternate heat sources 90 include, for example and without limitation, electric heaters (electric band heaters), steam heat (spargers), gas-fired heat, or any suitable combination thereof. Thus, as will be seen in FIGS. 4-12, such solar receivers also include the following major components:

Heat sources 90;
Internal Heat transfer fluid temperature sensors 92;
External Component temperature sensors 94; and
Controller 96.

Discussion is now made of the general configuration of the solar receiver 10. Referring to FIGS. 1-3, the solar receiver 10 has an arrangement of evaporative 12 and superheater 14 heat transfer surfaces, a vertical steam/water separator 16 structurally and fluidly interconnected thereto; and a vertical, internal support structure 18 provided to top support the vertical steam/water separator 16 and the heat transfer surfaces 12, 14. The terms "heat transfer fluid" and "water" are used interchangeably hereinafter. The vertical support structure 18 is interposed between the vertical steam/water separator 16 and the arrangement of heat transfer surfaces, 12, 14. This design allows for free downward thermal expansion of the panels and vertical separator. The support structure uses standard structural steel shapes and plate made of typical carbon steel material, such as A36 and is for the most part, bolted together. Other materials may be employed, depending upon temperature and other considerations. Structural tubing can be employed if desired.

Each side of the solar receiver 10 comprises one evaporator tube panel 12 and one superheater panel 14. Two primary superheater (PSH) panels 14 form one corner of the receiver 10 and two secondary superheater (SSH) panels 14 form an opposite corner (not shown). The evaporator 12 and superheater 14 panels are constructed of closely spaced tangent loose tubes (no membrane) with tube bends near the headers 86, 88 for additional flexibility. The tubes are small diameter thin wall tubes to minimize hot to cold face tube temperature differentials. The tube attachments allow for unrestrained thermal expansion of the tube panels in both the horizontal and vertical directions, thereby eliminating additional tube stresses. These design features maximize flexibility and minimize thermal stresses and the potential for tube bowing. Other arrangements of evaporator tube panels 12 and superheater tube panels 14 are also contemplated. For example, the evaporator 12 and superheater 14 panels may not be placed on every side, or the superheater panels 14 may not meet at a corner, or there may even be different configurations of plural evaporative panels 12 and superheater panels 14 provided on a given side.

The receiver 10 is designed for natural circulation and does not require a circulating pump. A circulation pump (see, e.g., the circulation pump 124 of FIG. 32) may optionally be included for freeze protection as discussed in greater detail below. Referring now to FIG. 1 and FIG. 3, during normal operation feedwater enters the vertical separator 16 near mid height of the receiver 10. The sub-cooled water flows down through the downcomer pipe 17 at the bottom of the vertical separator. Supply pipes 24 carry the water to the lower headers 88 of the evaporator panels 12. Solar energy/heat from the heliostats is absorbed by the water flowing upward though the tubes in the panels 12 which is lower in density than the water leaving the vertical separator 16 resulting in a natural pumping action. The water-steam mixture exits the headers at the top of the evaporator panels 12. Risers 26 carry the water-steam mixture to the vertical separator 16. The inlet nozzles of the riser connections 27 on the vertical separator 16 impart a downward spin to initiate moisture removal. Wet steam flows upward through a perforated plate, scrubber, and dry pan for final moisture removal. The water removed flows down and mixes with the water inventory in the vertical separator 16 for recirculation. While the supply pipes 24 and the risers 26 are illustrated as being relatively straight fluid paths, their actual design in terms of arrangement and length will be determined by the degree of flexibility required to accommodate expected motions caused by thermal expansion and contraction during operation of the solar receiver. It is thus likely that additional bends or length may be necessary to provide such flexibility.

Referring to FIG. 1, dry saturated steam leaves the top of the vertical separator 16 and flows through the saturated connections 28 to the PSH 14 inlet headers located at the top of the panels 14. Both PSH panels 14 have one or more (in one embodiment, five) steam passes with plural (in one embodiment, nine (9)) tubes per pass with diaphragm headers 58 of a special design due to the fact that the panels are comprised of closely spaced tangent tubes. Steam flows through both PSH panels 14 in parallel, starting at the ends adjacent the evaporator panels 12 and flowing toward the center. This arrangement puts the coldest steam next to the evaporator panels 12 to protect the PSH 14 from spillage during startup. Steam then exits the PSH headers at the bottom, mixes and flows upward though the attemperator 30 and associated piping 32 (feedwater is used for attemperation), then splits and enters the SSH 14 headers at the top. The SSH panels 14 are arranged the same as the PSH panels 14, but are located on an opposite corner of the solar receiver 10. Steam leaves the receiver 10 via a main steam pipe (not shown) located at the bottom of the receiver 10.

The upper and lower headers 86, 88 and tube bends on the evaporator 12 and PSH, SSH panels 14 are protected from spillage and stray light energy by heat shields 34 that extend around the perimeter of the receiver 10. The heat shields 34 typically comprise stiffened steel plate that is supported by the receiver structure 18. The exposed side is painted white to reduce operating temperatures. The back side is not insulated to reduce operating temperatures. There is also a gap between the heat shield 34 and tubes forming the panels 12, 14 to allow natural air flow for additional cooling.

FIG. 2A is a side view of an evaporator tube panel 12, and FIG. 2B is an enlarged perspective exploded view of the tube panel. This construction also applies to the superheater panels 14. A reflective modular panel light barrier 36 is located behind the tubes 13 (i.e. the non-exposed face of the central tube panel) opposite the heat absorbing (i.e. exterior) side of the tube panel. The light barrier 36 is composed of an array of metal sheets and may be coated with white paint or other reflective material on the tube side to maximize reflectance of light energy back to the tubes and reduce operating temperatures of the barrier plate. The light barrier is supported by the tube attachment structure, i.e. the buckstay support system 20. Behind the light barrier (i.e. further interior of the solar receiver) is the insulation 38, which is covered by lagging. The light barrier is also designed to protect the insulation 38, support structure 20, and the interior parts of the solar receiver from rain and heat exposure that may travel through the gaps between the loose tangent tubes of the tube panels. The modular design of the light barrier simplifies removal for inspections and/or maintenance.

The solar receiver 10 generally includes instrumentation 40 to measure tube cold face and fluid temperatures, heat flux on panels and possibly strain, deflection and thermal expansion of various components of the receiver, if desired. In the figures, the location of this instrumentation 40 is merely schematically indicated, rather than specifically drawn and called out.

The vertical steam/water separator 16 operates in known fashion to separate the steam from the steam-water mixture. The vertical steam/water separator 16 is particularly suited to handling large transient swings in heat input to the heat exchanger 10 which may, in turn, cause large variations in water levels within the steam/water separator 16. The water separated from the steam-water mixture is conveyed to a lower portion of the separator 16, mixed with feedwater, and conveyed to the evaporative surface 12 to start the process over again.

The vertical steam/water separator 16 was chosen over a traditional horizontal steam drum for the following reasons: 1) it fits well into the receiver interior; 2) it eliminates the possibility of drum humping associated with a horizontal steam drum; 3) steam separating surface area could be achieved with the vertical separator; and 4) if desired, the vertical separator can be used to support the heat exchanger heating surface tube panels and can alternatively be top supported or bottom supported.

Normally, another advantage to the use of the vertical steam/water separator 16 in the solar receiver 10 instead of a traditional horizontal steam drum is that the vertical separator maintains water temperature better than a steam drum because the riser tubes are above the water level in the vertical separator which prevents reverse circulation after shutdown when the evaporator panels cool.

After being shut down, the water in the evaporator panels 12 cools and is more dense than the water in the vertical separator 16, which is still warm and less dense. Because of this density difference, the water in the evaporator panels 12 wants to flow backwards: down the evaporator panels 12, through the supply pipes 24 and supply connections 25 and up the downcomer pipe 17 into the vertical separator 16; if this occurred the cool water from the evaporator panels 12 would quickly cool the vertical separator 16. However, because the riser penetrations 27 in the vertical separator 16 are above the water level, the warmer water already in the vertical separator 16 is not connected to the risers 26 and cannot flow into the risers 26 and upper evaporator panel 12 headers, and thus the backwards circulation cannot occur. This forces the cool water in the evaporator panels 12 to remain in the evaporator panels 12, allowing the warm water to remain in the vertical separator 16 which helps to conserve vertical separator 16 temperature and pressure overnight. However, in some climate conditions (e.g. winter) the water in the evaporator panels can freeze.

The inside diameter of the vertical steam/water separator vessel 16 is selected to provide enough surface area for the steam separating equipment and enough water inventory to allow the receiver to operate at rated steam flow for several minutes in the event of a feedwater trip, even if the water level within the vessel is at a low level when the trip occurs.

The steam separating equipment within the vessel 16 comprises a perforated plate, scrubber, and dry pan which are located near the top of the vertical separator 16. The purpose of these components is to remove any additional moisture from the steam before it exits the vessel 16. This, in turn, reduces the possibility of solids carryover into the superheater 14 which could plate out and insulate the inside of the tubes causing hot spots and tube failures.

The feedwater connection to the vertical steam/water separator has a thermal sleeve. This nozzle is angled down so that feedwater does not impinge and thermally shock the vessel 16 if the water is below the low water level.

Two platforms 42 are provided to access the upper and lower manways or access doors on the vertical steam/water separator 16, which are accessible by ladders. The upper and lower manways or access doors (see FIG. 1 and FIG. 3) provide access to service the steam separating equipment and vortex inhibitor, respectively. The vessel 16 is insulated and lagged to reduce heat loss.

The solar receiver 10 is designed to operate without a circulation pump and with natural circulation characteristics. This means that flow within the evaporator circuits is demand driven, meaning that evaporator panels receiving more heat input have more steam/water flow and panels receiving less heat input will have less flow. In some embodiments, if desired in order to facilitate the circulation of the water and water-steam mixture throughout the solar receiver 10, one or more circulation pumps may be provided at the lower portion of the separator 16 in the downcomer pipe 17 for pumping the water back to the evaporative surface to provide for assisted circulation or pumped circulation operation.

The solar receiver panels 12, 14 are designed for high reliability to achieve a long life under highly cyclic operating conditions and be capable of withstanding daily startups, shutdowns and cloud transients without suffering low cycle fatigue damage. The evaporative 12 and superheater 14 heat transfer surfaces are comprised of loose tangent tube panels; that is, the tubes are closely spaced to one another and are not welded together. During operation, each tube in the panels can thermally expand to a different length than other tubes due to temperature differences between the tubes. The lower headers 88 will approximately move down based on the average tube temperature and remain horizontal and, because they are much stiffer than the tubes, they will not bend. This will impart stresses in the tubes, particularly in the superheater, because each pass operates at a different average temperature. The tube bends at the inlet and outlet headers therefore provide a spring-like flexible section, to reduce tube stresses near the header connections and reduce the potential for tube bowing. Top supporting the panels provides free downward thermal expansion. The tubes are small diameter with thin walls to minimize hot-to-cold-face and through-tube-wall temperature differentials, thermal stresses and the potential for bowing.

The evaporative heating surface 12 panels are provided with lower inlet headers and upper outlet headers. This facilitates the natural circulation design of the solar receiver 10. The steam-water mixture generated in tubes forming the evaporative heating surface 12 panels is collected in the upper outlet headers which also serve as a mix point. Stubs on the outlet headers are interconnected via risers 26 to stubs or riser connections 27 on the upper portion of the vertical steam/water separator 16. The vertical steam/water separator 16 operates in known fashion to separate the steam from the steam-water mixture.

In some embodiments, where the heat exchanger 10 is designed simply for saturated steam production, without superheat, all the panels would be evaporative surfaces 12, and saturated steam outlet connections 28 from the top portion of the separator 16 would convey the steam to its downstream location and use.

In other embodiments, depending upon the initial steam temperature and pressure, and the desired outlet superheated steam temperature, the panels comprising the superheater surfaces 14 may be multiple-pass superheaters in order to provide adequate mass flow rates within the superheater surface tubes. Such multiple pass designs take into account the temperatures of not only the tubes in the superheater 14, but also the temperature of the tubes in an adjacent structure or evaporator panel 12, in order to address differential thermal expansion concerns. The superheater 14 described herein may refer, depending upon the context, to either or both of primary superheater (upstream of a stage of spray attemperation for steam temperature control) and secondary superheater (downstream of a stage of spray attemperation for steam temperature control). (An attemperator 30 is present in FIG. 1.)

The solar receiver 10 has one stage of spray attemperation and piping 32 for steam temperature control, located between the PSH and SSH, as shown in FIG. 1. A single stage reduces cost and simplifies piping. The attemperator and piping 32 are located inside the receiver enclosure as shown. The attemperator uses feedwater for attemperation. The attemperator and piping are supported by the receiver support structure 18 and/or by the panel headers. These components are also insulated and lagged to reduce heat loss Various embodiments of solar receivers using an alternate heat source 90 are illustrated in FIGS. 4-12. Generally, the alternate heat source is strategically placed at a location that will induce natural circulation of water or heat transfer fluid (HTF) within the solar receiver. The natural circulation will also cause the heated HTF to naturally flow from warmer components to relatively cooler components. The combination of increased HTF temperature and HTF movement will protect the solar receiver components from freezing without the need for draining the solar receiver.

Figure 4:
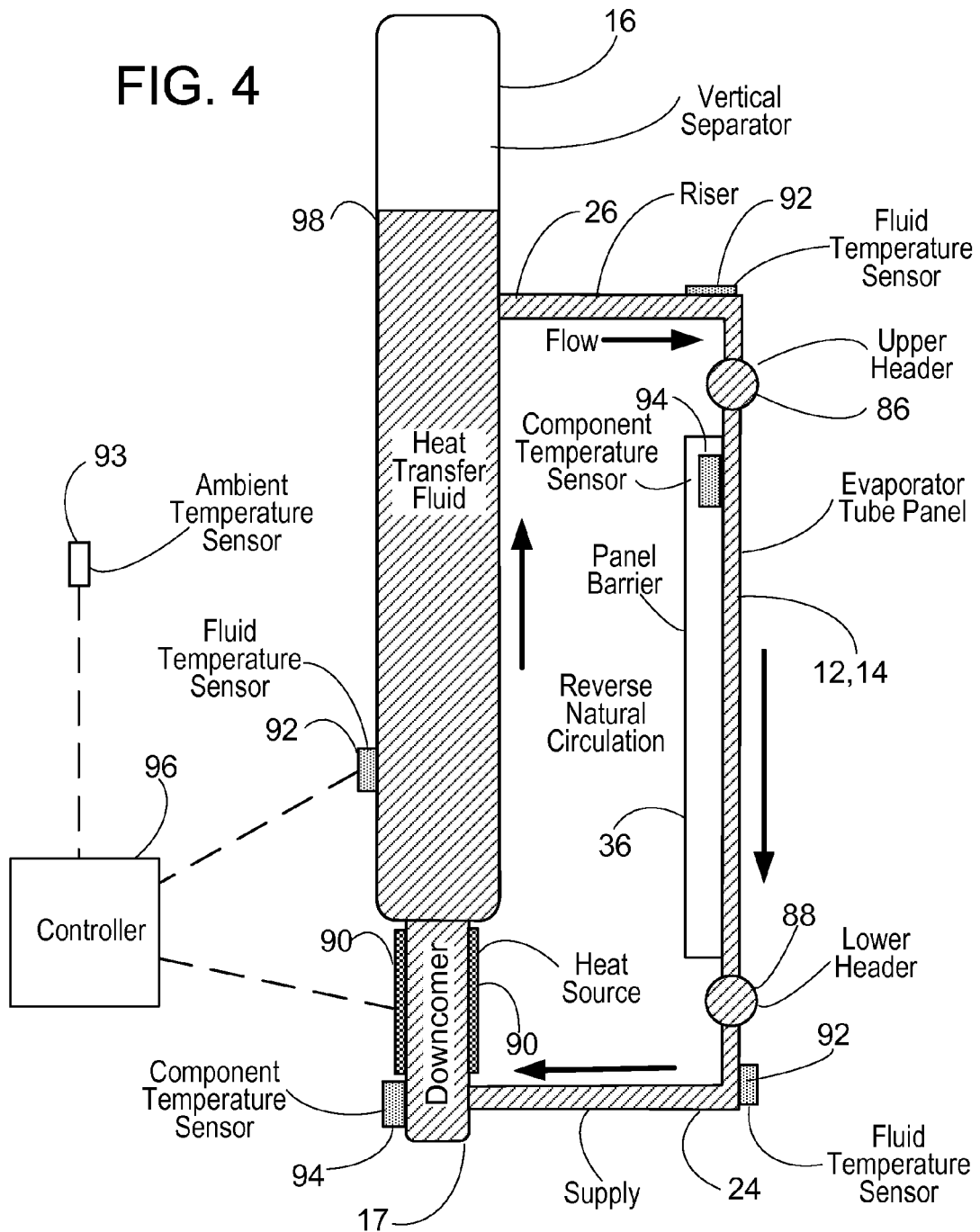
FIG. 4 and FIG. 5 are side views of a solar receiver using an alternate heat source for freeze protection on the outside of or within the downcomer.

FIG. 4 illustrates a first exemplary embodiment of a solar receiver 10 with freeze protection implementation. The vertical separator 16 includes an alternate heat source 90 in contact with an outside portion of the downcomer 17. A heat transfer fluid 98 substantially fills the vertical separator 16, the riser 26, the upper header 86, the evaporator tube panel 12, 14, the lower header 88, the supply pipe 24, and the downcomer 17.

In some embodiments, a plurality of temperature sensors, i.e., fluid temperature sensors 92, ambient air temperature sensor 93, component temperature sensors 94 are used to communicate the temperature of the fluid 98 or the components (e.g., separator 16, the riser 26, the upper header 86, the evaporator tube panel 12, 14, the lower header 88, the supply pipe 24, and the downcomer 17) to the controller 96. The controller 96 is in communication with each of these sensors 92-94 which communicate relative temperature, depending upon their respective locations. For example, the sensors 92 indicate a temperature of the fluid 98, whereas the sensors 94 correspond to the temperature of the aforementioned components of the solar receiver 10. In some embodiments, the external temperature sensors 94 may include an ambient air temperature sensor, so as to detect the temperature of the environment surrounding the solar receiver 10. The controller 96 is operative to activate or deactivate the alternate heat source 90, so as to maintain the temperature of the fluid 98 or the aforementioned components at a preselected temperature, e.g., above the freezing temperature of the fluid 98, above a set threshold temperature, or the like. Upon a determination by the controller 96 that the detected temperature from the sensors 92-94 has met a preselected threshold, the controller 96 may activate the alternate heat source 90. Activation of the alternate heat source 90 may increase the temperature of the components, the fluid 98, or both. In some embodiments, the controller 96 selectively activates the alternate heat source 90 based upon a combination of the detected temperatures provided by the various sensors 92-94.

The application of thermal energy to the downcomer 17 results in a reverse natural circulation of the heat transfer fluid 98 within the solar receiver's evaporator circuitry 10. The warmed fluid will rise up the downcomer 17 through the separator 16 and flow through the risers 26 and into the upper headers 86. Thereafter, the fluid 98 transits the evaporator tube panels 12, 14, where the HTF loses heat to the atmosphere and cools, becoming more dense. This causes the HTF to then flow to the lower header 88, then to the supply pipe 24 and returns to the downcomer 17 for additional heating. This reverse natural circulation helps prevent freezing of the fluid 98 inside the evaporator tubes. In other embodiments, one or more circulation pumps could also be placed in fluid communication with the aforementioned components, so as to establish sufficient circulation of the fluid 98 to prevent the freezing thereof.

Figure 5:
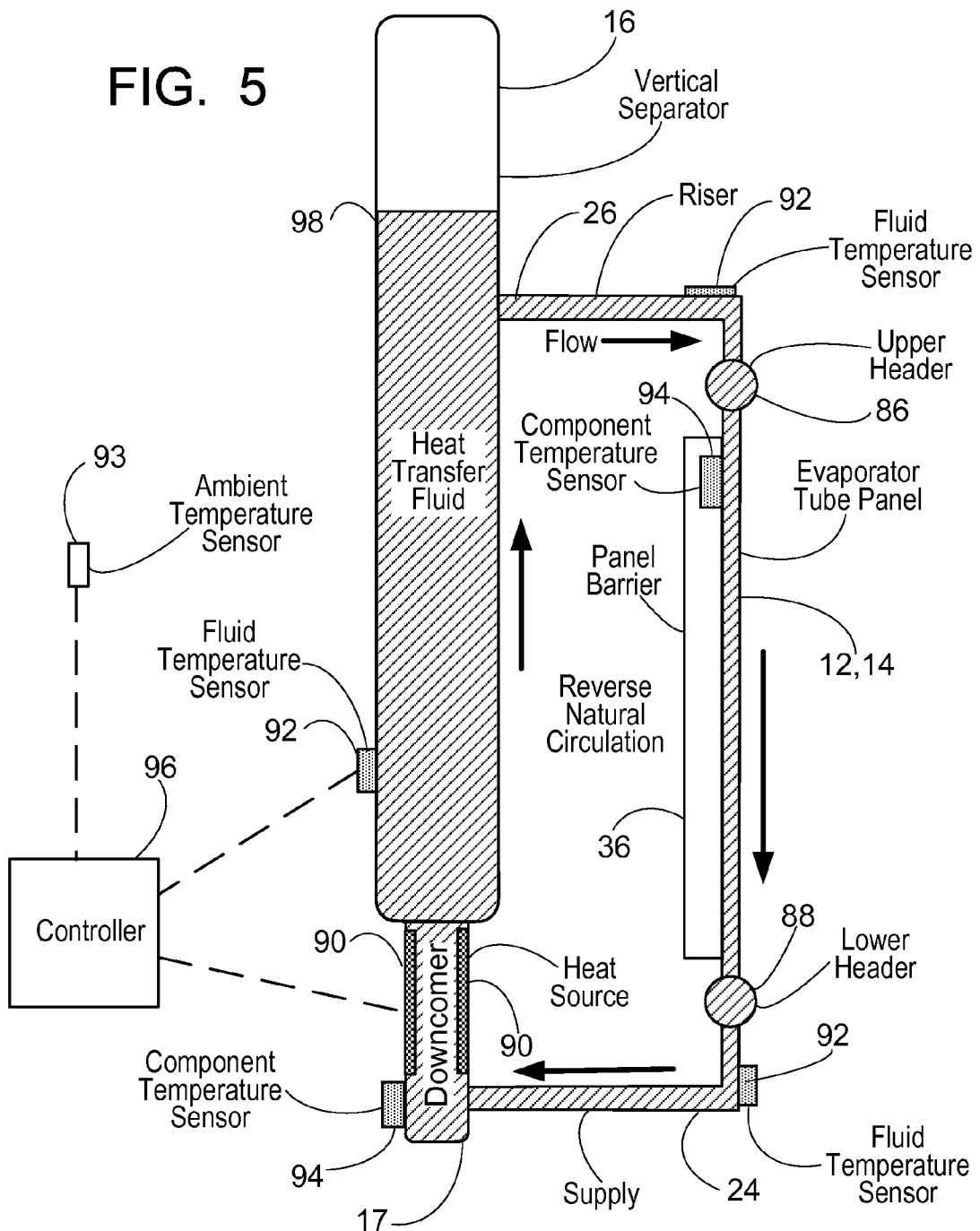

FIG. 5 illustrates another exemplary embodiment of the freeze protection configured solar receiver 10. Here, the alternate heat source 90 is located within the fluid 98, i.e., the alternate heat source 90 is located within the downcomer 17. This location for the alternate heat source might use less energy to heat the fluid 98 when the wall thickness of the downcomer is very thick and external heat application would be insufficient to heat the fluid through the wall.

Figure 6:
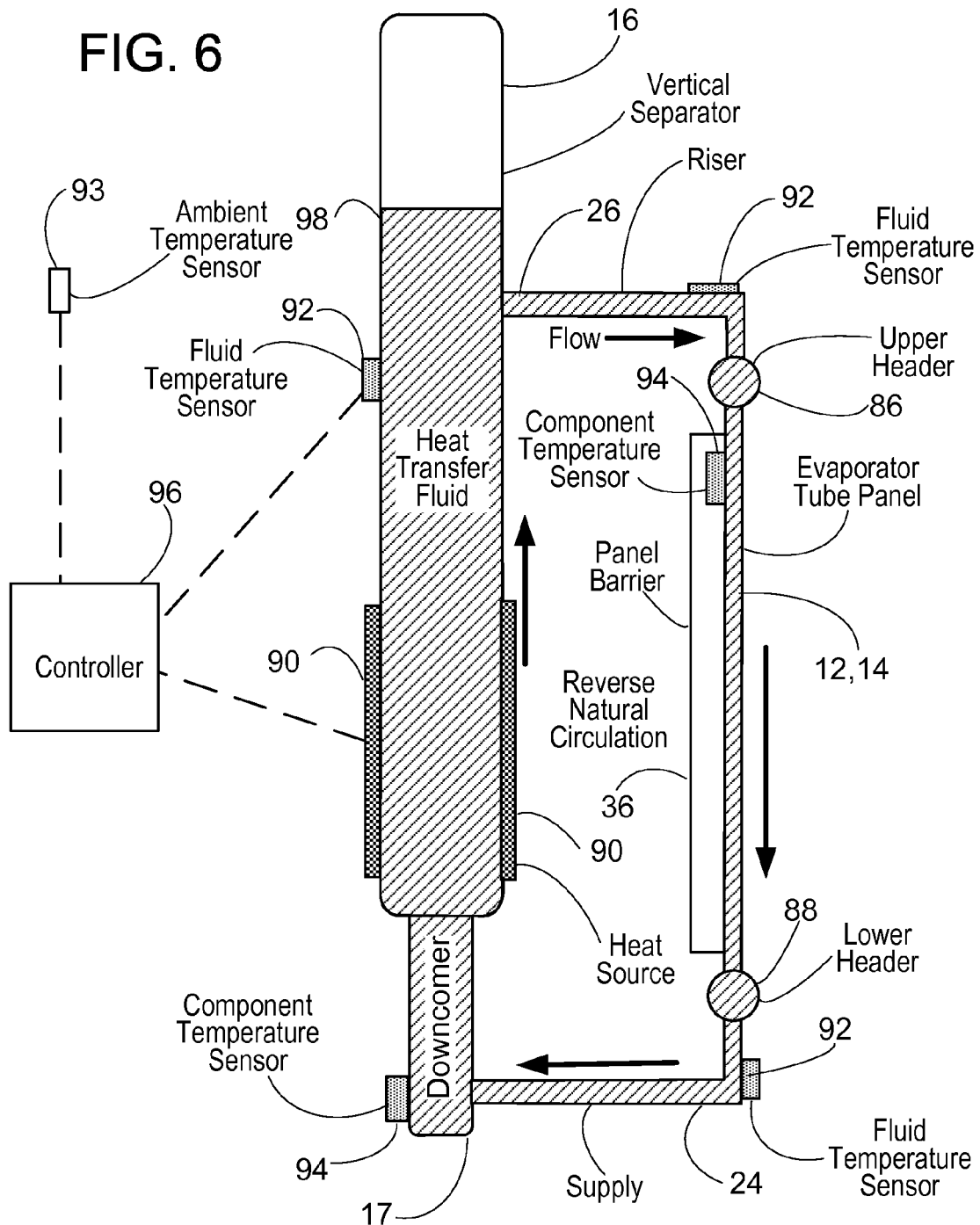
FIG. 6 and FIG. 7 are side views of the solar receiver using an alternate heat source for freeze protection on the outside of or within the vertical separator.
Figure 7:
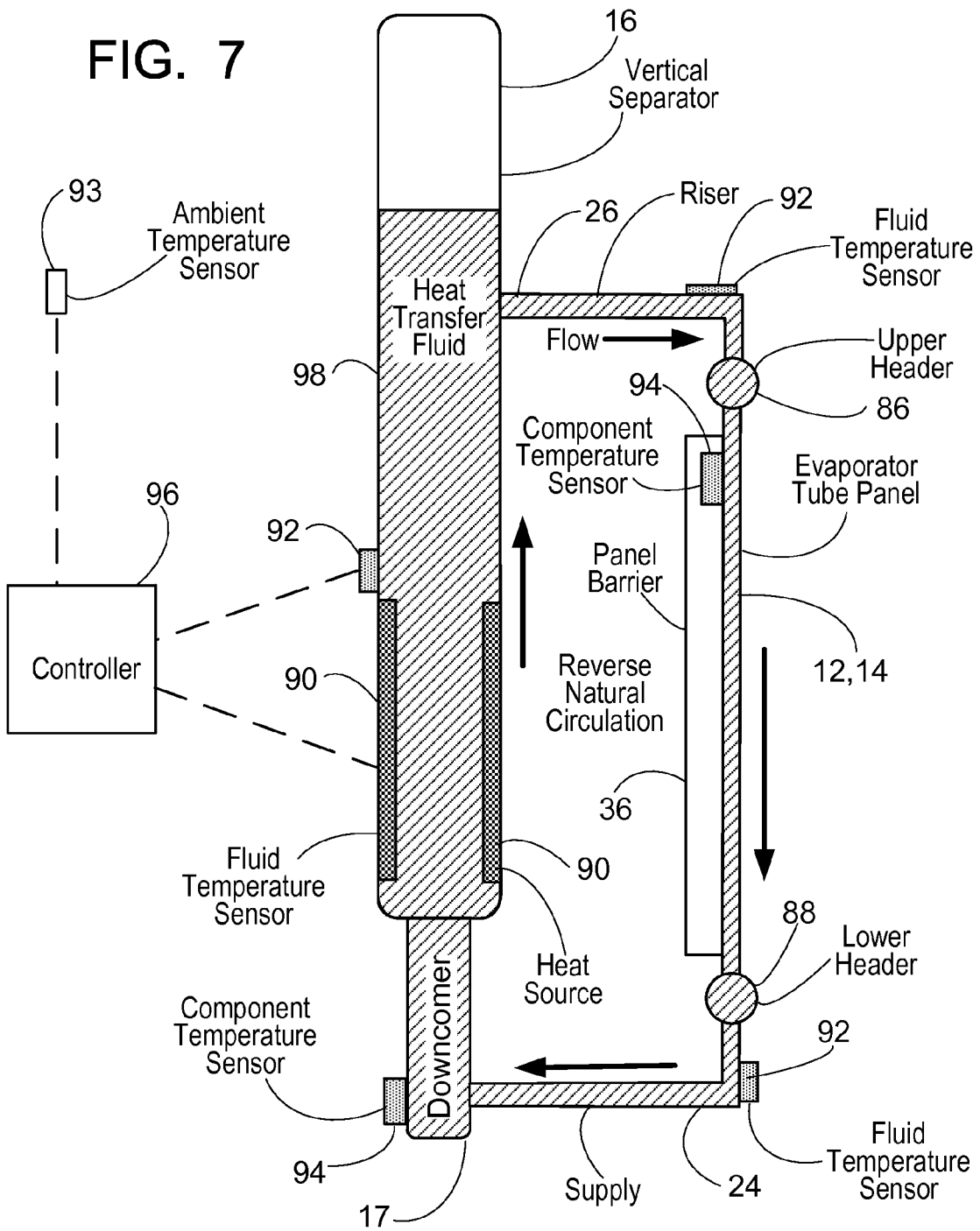

FIG. 6 and FIG. 7 illustrate additional exemplary embodiments of freeze protection for a solar receiver 10. In FIG. 6, the solar receiver 10 includes at least one alternate heat source 90 in contact with an outside portion of the base of the vertical separator 16. The positioning of the alternate heat source 90 at the vertical separator 16 facilitates a reverse natural circulation flow, as discussed above with respect to FIGS. 4-5. That is, the application of the heat to the vertical separator 16 results in warmed heat transfer fluid 98 crossing the risers 26 to the upper header 86, and thereafter through the tube panels 12, 14. As the fluid 98 cools, it transits through the lower header 88, supply pipe 24, and the downcomer 17. After returning to the downcomer 17, the heat transfer fluid is subsequently pulled, via the aforementioned circulation, back into the vertical separator 16 for heating and the process suitably continues thereafter. FIG. 7 illustrates an embodiment wherein the solar receiver 10 includes one or more alternate heat sources 90 positioned inside the vertical separator 16 at the base.

FIG. 6 and FIG. 7 also illustrate a plurality of temperature sensors 92, 93, and 94 in data communication with the controller 96. As previously discussed, the fluid temperature from the sensor 92, the ambient air temperature from the sensor 93, and the component temperature from the sensor 94 are used by the controller 96 to activate, deactivate, or adjust the functioning of the alternate heat source 90, so as to prevent solidification/freezing of the heat transfer fluid 98. Again, placement of the alternate heat source 90 within the body of the vertical separator 16 may provide additional benefits to maintaining an above-freezing temperature of the heat transfer fluid 98, particularly when the separator 16 walls are extraordinarily thick.

Figure 8:
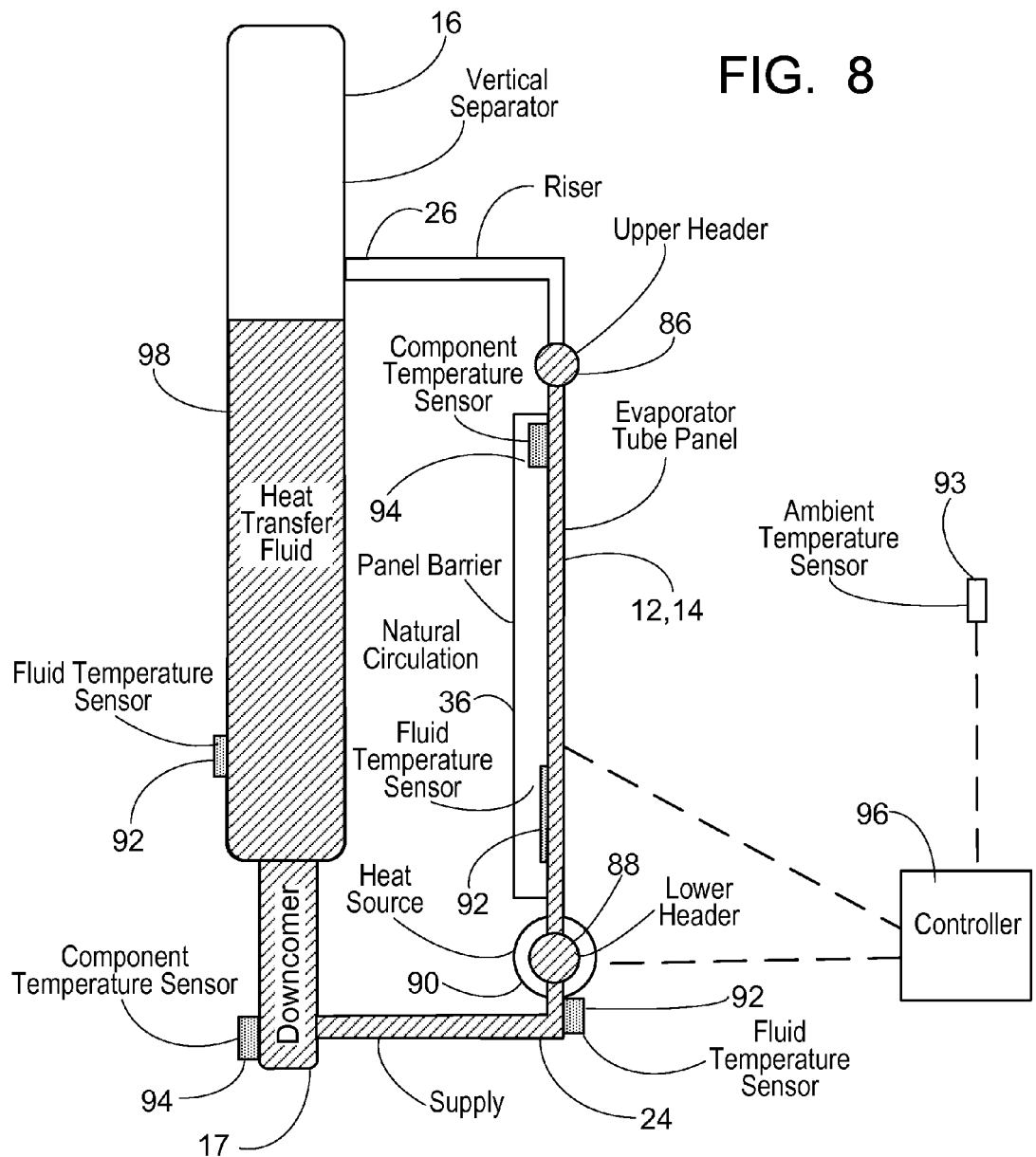
FIG. 8 and FIG. 9 are side views of the solar receiver using an alternate heat source for freeze protection on the outside of or within the lower header.
Figure 9:
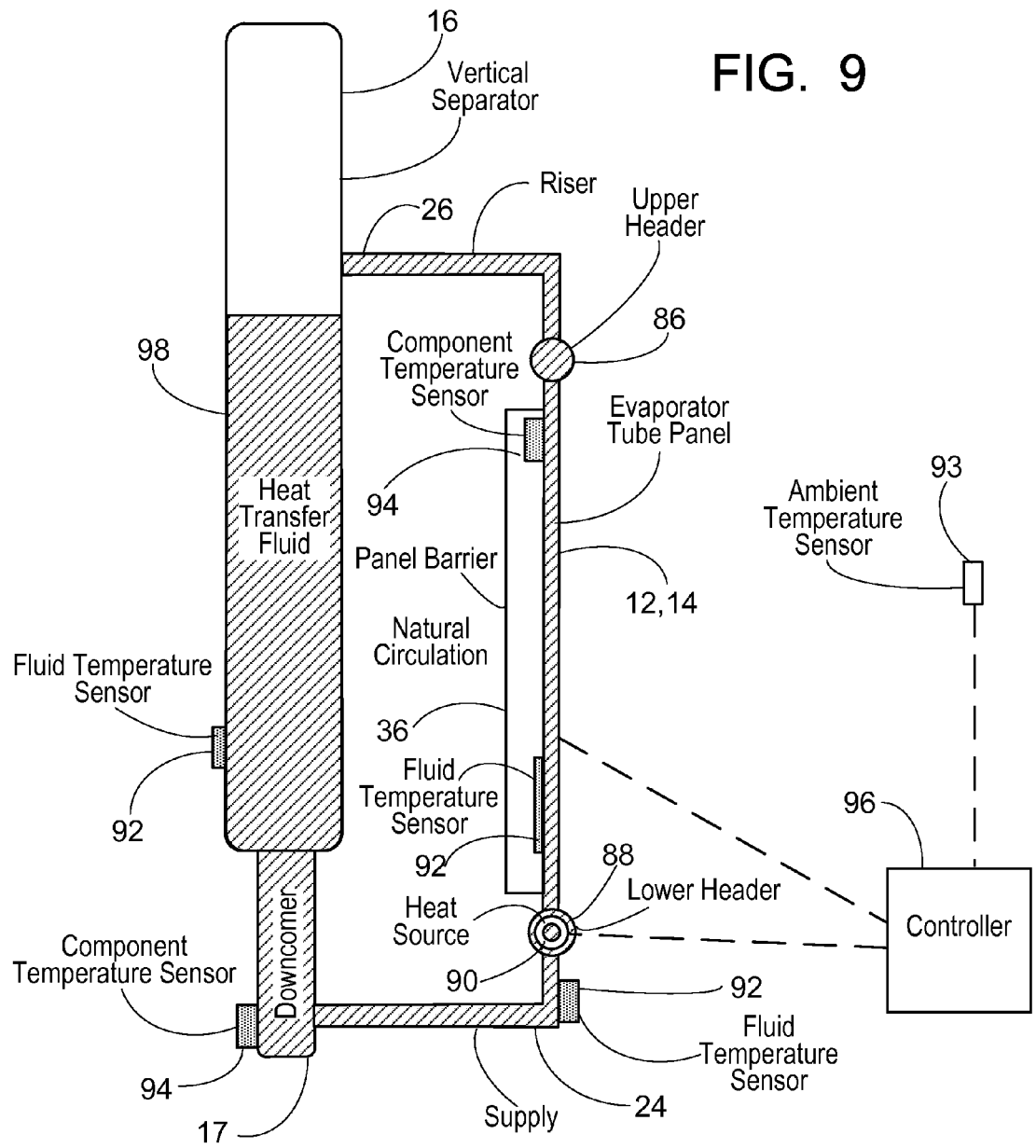

FIG. 8 and FIG. 9 illustrate additional exemplary embodiments of freeze protection for a solar receiver 10. In FIG. 8, the solar receiver 10 includes an alternate heat source 90 in contact with an outside portion or exterior surface of the lower header 88. In FIG. 9, the alternate heat source is located within the lower header 88 of the solar receiver 10. Also depicted are a plurality of temperature sensors 92-94, which communicate the temperature of the fluid 98 or the components (e.g., separator 16, the upper header 86, the evaporator tube panel 12, 14, the lower header 88, the supply pipe 24, and the downcomer 17) to the controller 96.

These embodiments can be useful when the heat transfer fluid 98 substantially fills the vertical separator 16, the upper header 86, the evaporator tube panel 12, 14, the lower header 88, the supply pipe 24, and the downcomer 17, but does not rise to the level through the riser 26, which remains empty of fluid 98. The placement of the alternate heat source 90 induces natural circulation of the heat transfer fluid 98 within the fluid filled components of the evaporator tube panels 12, 14, the lower headers 88, and the upper headers 86, which keeps these components warm. Cooler water then naturally flows down to the lower header 88 for reheating, and the cycle repeats thereafter. The combination of fluid 98 movement in addition to the elevated temperature facilitates freeze protection of the solar receiver 10 without requiring the drainage of the fluid 98. The alternate heat source 90 may also be placed in contact with the exterior of the supply pipe 24, or located within the supply pipe 24, to achieve a similar effect.

In contrast to FIG. 4 through FIG. 7, the heated fluid 98 in FIG. 8 and FIG. 9 does not also pass through the downcomer 17, vertical separator 16, or riser 26. The downcomer 17 and the vertical separator 16 are typically sufficiently insulated and protected from the external elements that heating or circulation of the fluid 98 therein should not be necessary during normal shutdown conditions (e.g., at night).

Figure 10:
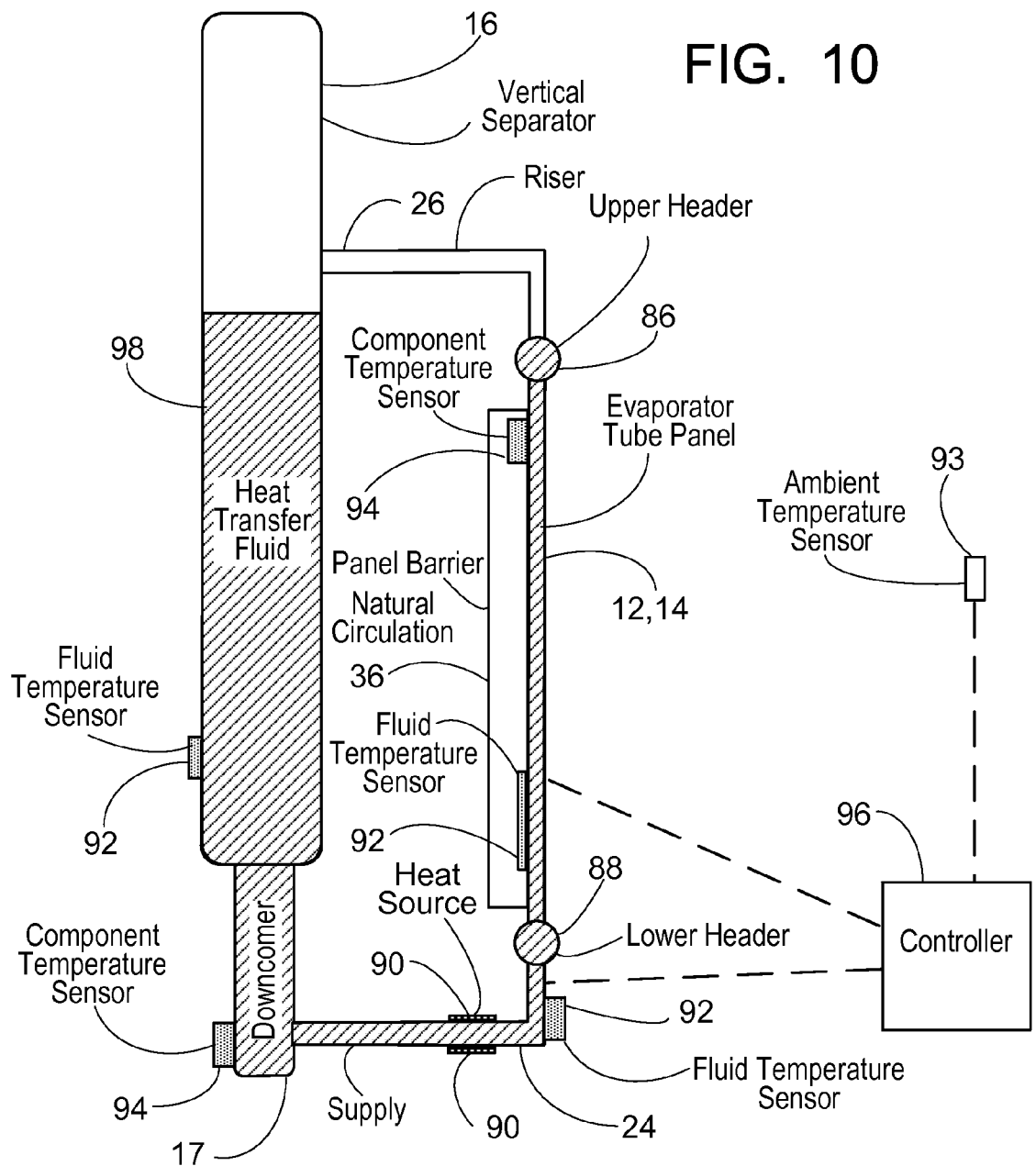
FIG. 10 and FIG. 11 are side views of the solar receiver using an alternate heat source for freeze protection on the outside of or within the supply pipe.
Figure 11:
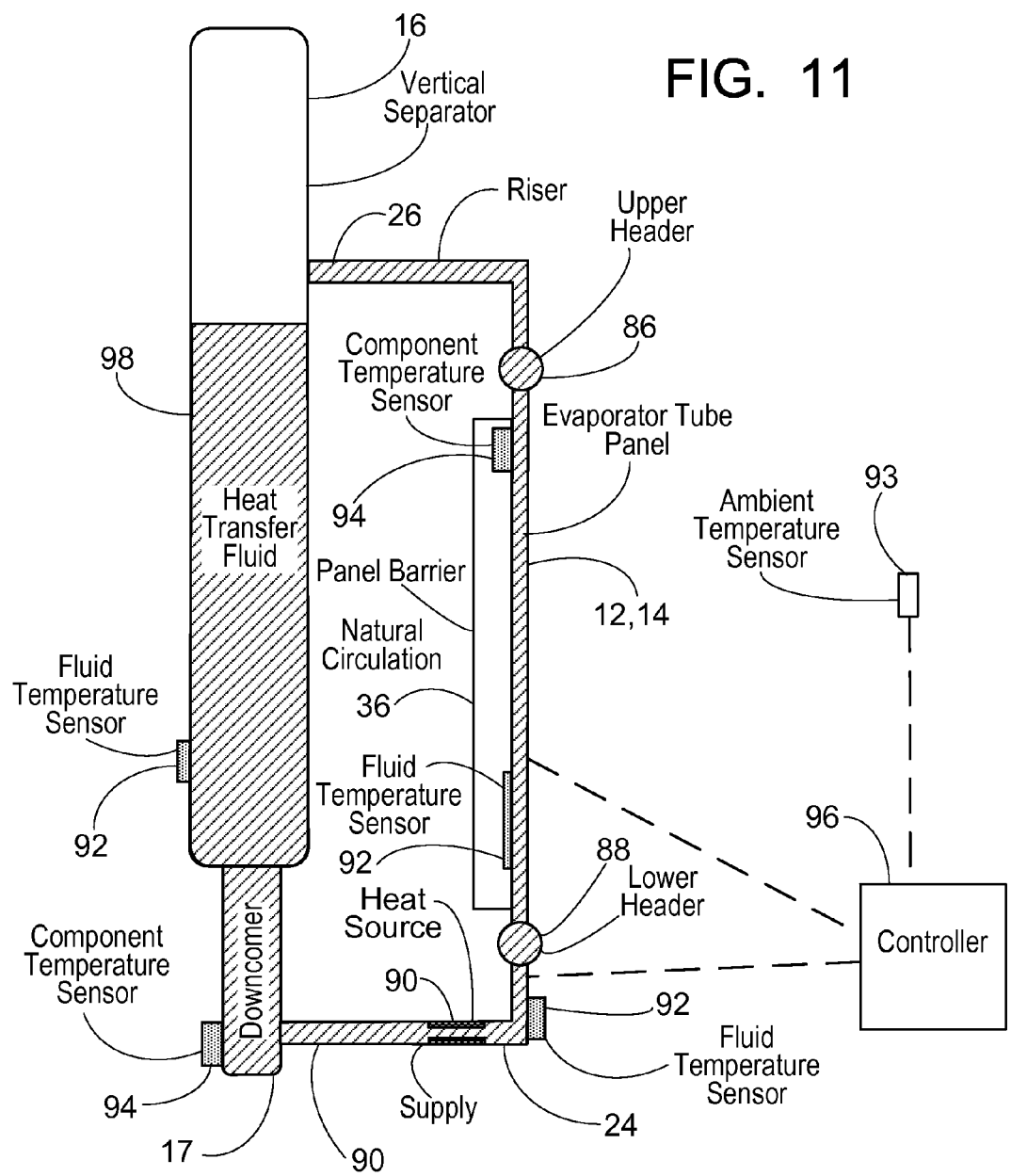

FIG. 10 and FIG. 11 show additional embodiments of the freeze protected solar receiver 10. As illustrated in FIG. 10, the alternate heat source 90 is in contact with an outside portion of the supply pipe 24, while in communication with the controller 96. FIG. 11 depicts the positioning of the alternate heat source 90 within the supply pipe 24. In such embodiments, the alternate heat source 90 is usually placed in the supply pipe 24 in closer proximity to the lower header 88 than to the downcomer 17, so as to facilitate the flow of warmed heat transfer fluid 98 through the tube panels 12, 14 in the manner set forth above with respect to FIG. 8 and FIG. 9 (rather than sending warmed fluid through the downcomer). Thus, upon receipt of temperature information from the associated temperature sensors 92-94, the controller 96 activates (or deactivates) the alternate heat source 90. When activated, the alternate heat source 90 applies thermal energy to the fluid 98 within the supply pipe 24, which then rises through the lower header 88, evaporator tube panels 12, 14, and the upper header 86. As the fluid 98 cools, natural circulation causes the cooled fluid to fall back down from the upper header 86 to the supply pipe 24 for additional heating, whereupon the cycle repeats and/or adjusts as needed to warm other tubes.

Figure 12:
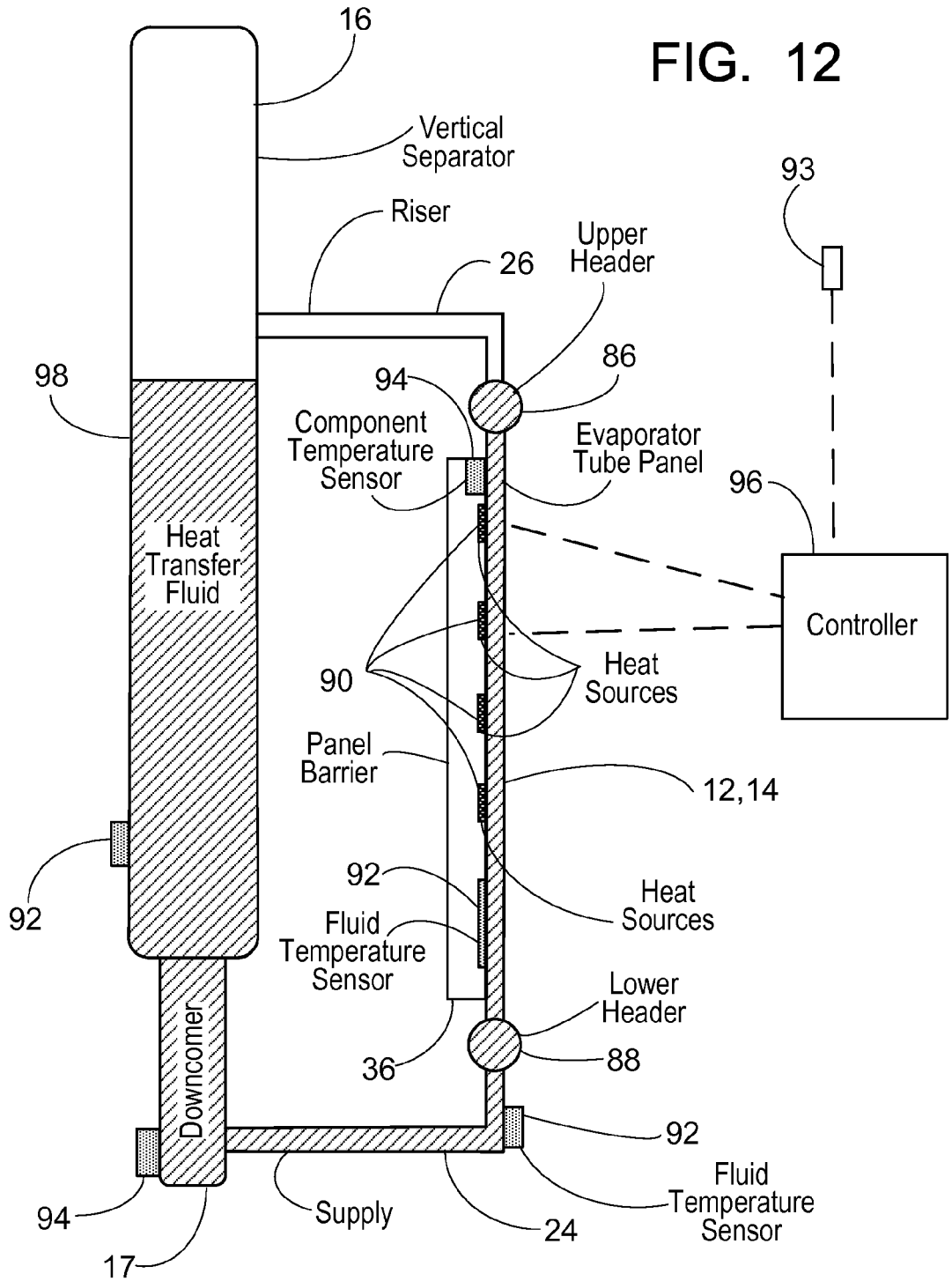
FIG. 12 is a side view of the solar receiver using an alternate heat source for freeze protection in contact with the tube panel.

FIG. 12 depicts another exemplary embodiment of the freeze protected solar receiver 10. Here, a plurality of alternate heat sources 90 are placed to contact the tubes of the evaporator tube panel 12, 14. The level of the heat transfer fluid 98 is raised to fill the upper headers 86 so that when the controller 96 activates the alternate heat sources 90, natural circulation can occur from tube to tube or within a given tube of the evaporator tube panels 12, 14. Suitable alternate heat sources 90 may include, for example and without limitation, electric band heaters configured to contact the exterior of the tubes, or lie within a plurality of tubes, steam spargers for injecting steam against the tube exterior, or the like. The naturally induced movement of heat transfer fluid 98 through the tubes of the panels 12, 14 in addition to the elevated temperature thereof protects the panels 12, 14 from freezing. Also shown are sensors 92-94 in data communication with the controller 96, which then activates or deactivates the alternate heat sources 90 as required based upon the temperature information received from the sensors 92-94.

The freeze protection provided by the embodiments illustrated in FIGS. 4-12 can also be enhanced by sealing the pressure vessel using an isolation valve in the saturated connection piping 28 near the top of the vertical separator, which is above the water level in the vertical separator (see FIG. 3). In the embodiments of FIGS. 4-12, this isolation valve(s) in the saturated steam connection piping would be closed, which would help to maintain elevated pressure and temperature, and confine the HTF within the pressure vessel.

Please note that while illustrated in FIGS. 4-12 as being located within or in contact with various components of the solar receiver 10, the temperature sensors 92-94 may be located on or in any one, a plurality of, or all of the fluid bearing components, e.g., the risers 26, the evaporator tube panels 12, 14, the supply pipe 24, the downcomer 17, the vertical separator 16, or other fluid bearing components associated with the solar receiver 10 depicted therein. Similarly, temperature sensors 92-94 may be in contact with any one of the other fluid transfer components, e.g., the downcomer 17, the panel barrier 36, or the like, associated with the solar receiver 10. The sensors 92-94 may be in contact with one, some, or all of such components, so as to detect their temperature and thereby allow the controller 96 to deduce, calculate, or otherwise ascertain the temperature of the heat transfer fluid 98. In addition, although not shown, the solar receiver 10 may include any number of external temperature sensors so as to provide the controller 96 with suitable information relative to the ambient air temperature surrounding the solar receiver, thereby enabling proactive activation of the alternate heat source 90 relative to the heat transfer fluid.

Figure 13:
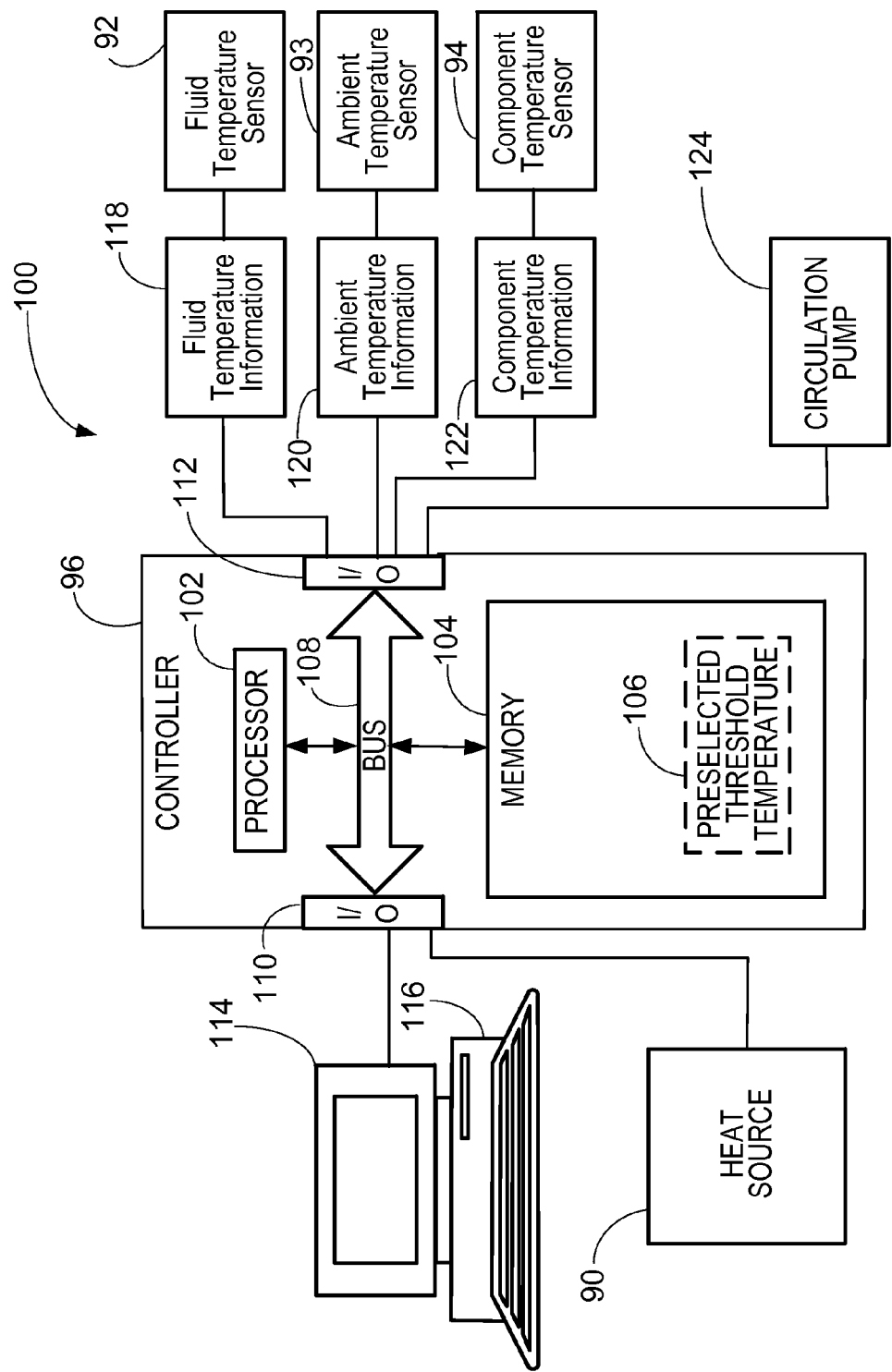
FIG. 13 diagramatically illustrates controller operation of freeze protection equipment in the various embodiments described above.

Referring now to FIG. 13, a suitable system 100 for controlling the alternate heat source(s) 90 is depicted. The various components depicted in FIG. 32 represent various aspects of a control system, and other similar components, implemented via hardware, software, or a combination thereof, are capable of being substituted therein. The system 100 can be implemented using a distributed computing environment, such as a computer network, which is representative of any distributed communications system capable of enabling the exchange of data between two or more electronic devices. Examples of such a computer network include, without limitation, a virtual local area network, a wide area network, a personal area network, a local area network, the Internet, an intranet, or the any suitable combination thereof. Such a computer network includes both physical layers and transport layers, such as, for example, Token-Ring, Ethernet, or other wireless or wire-based data communication mechanisms. While depicted in FIG. 13 as a networked set of components, the system 100 can also be implemented on a stand-alone device adapted to perform the methods described herein.

As shown in FIG. 13, the control system 100 includes the controller 96, which is capable of implementing the exemplary methods described below. The controller 96 may include a computer server, workstation, personal computer, combination thereof, or any other computing device.

The controller 96 includes hardware, software, and/or any suitable combination thereof, configured to interact with an associated user, a networked device, networked storage, remote devices, or the like. The exemplary controller 96 includes a processor 102, which facilitates the activation and deactivation of the alternate heat source 90, processes fluid temperature information 118, ambient air temperature information 120, and component temperature information 122, and performs comparisons against a preselected threshold 106 which are stored in memory 104 connected to the processor 102, as well as controlling the overall operation of the controller 96.

The controller 96 may include one or more interface devices 114, 116 for communicating with external devices. The I/O interface 110 may communicate with one or more of a display device 114, for displaying information to users, such as location-related data, and a user input device 116, such as a keyboard or touch or writable screen, for inputting text, and/or a cursor control device, such as mouse, trackball, or the like, for communicating user input information and command selections to the processor 102. The various components of the controller 96 may be all connected by a data/control bus 108.

The controller 96 may be a general or specific purpose computer, such as a PC, such as a desktop, a laptop, palmtop computer, portable digital assistant (PDA), server computer, cellular telephone, tablet computer, pager, combination thereof, or other computing device capable of executing instructions for performing the exemplary methods.

The memory 104 may represent any type of non-transitory computer readable medium such as random access memory (RAM), read only memory (ROM), magnetic disk or tape, optical disk, flash memory, or holographic memory. In some embodiments, the memory 104 comprises a combination of RAM and ROM. In other embodiments, the processor 102 and memory 104 may be combined in a single chip. The network interface(s) 110, 112 allow the computer to communicate with other devices via a computer network, and may comprise a modulator/demodulator (MODEM). Memory 104 may store data to be processed in the methods as well as the instructions for performing the exemplary methods.

The digital processor 102 can be variously embodied, such as by a single-core processor, a dual-core processor (or more generally by a multiple-core processor), a digital processor and cooperating math coprocessor, a digital controller, or the like. The digital processor 102, in addition to controlling the operation of the controller 96, executes instructions stored in memory 104 for performing temperature monitoring, heat source control, and freeze protection as discussed above.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As illustrated in FIG. 13, the controller 96 is configured to receive, via the I/O interface 112, information 118-122 from a plurality of temperature sensors 92, 93, and 94. As previously discussed, each of the temperature sensors 92-94 is suitably configured to detect the temperature of their respective locations and communicate the same to the processor 102. As shown, the fluid temperature sensor 92 collects fluid temperature information 118 corresponding to the temperature of the heat transfer fluid 98 within the various fluid bearing components, e.g., the separator 16, the riser 26, the upper header 86, the evaporator tube panel 12, 14, the lower header 88, the supply pipe 24, and the downcomer 17. This fluid temperature information 118 is then communicated via a suitable communications medium to the controller 96. Ambient air temperature information 120 is collected from the ambient air temperature sensor 93, which may be located in proximity to the solar receiver 10, but not in direct physical contact with the aforementioned fluid bearing components, so as to provide the external air temperature absent interference from the components of the receiver 10. In addition, component temperature information 122 is communicated to the processor 104 from the component temperature sensors 94. In certain embodiments, each of the fluid bearing components, e.g., the separator 16, the riser 26, the upper header 86, the evaporator tube panel 12, 14, the lower header 88, the supply pipe 24, and the downcomer 17, may include a temperature sensor 94 to detect the relative temperature thereof.

The temperature information 118-122 is then communicated to the controller 96, and may be stored in the memory 104. In some embodiments, an averaging operation is performed by the processor 102 on the temperature information 118-122 so as to determine an average temperature of the solar receiver 10. In other embodiments, the temperature information 118-122 is compared to a preselected threshold 106. This preselected threshold 106 may be selected manually via the user interface devices 114-116, or automatically determined based upon the heat transfer fluid 98 utilized in the solar receiver 10.

The processor 102 compares the received temperature information 118-122 to the preselected threshold temperature 106. When the temperature information 118-122 indicates that the preselected threshold temperature 106 has been met, the processor 102 of the controller 96 communicates an activation signal to the alternate heat source 90 to initiate heating. Alternatively, the processor communicates an activation signal to a user who can then manually activate the alternate heat source 90 (or circulation pump 124) via the user interface devices 114-116.

As previously discussed, suitable implementations of the alternate heat source 90 may include electric, gas, steam, or the like. The processor 102 may be configured to vary the output of the alternate heat source 90 so as to automatically vary the heat output in order to maintain a set minimum component temperature. Alternatively, a constant output alternate heat source 90 conservatively sized to be acceptable across a range of operating conditions may be used. According to other embodiments, alternative means of introducing heat to the fluid filled components of the solar receiver 10 could also be used to achieve water movement, elevated temperature, and thus freeze protection. For example, injecting steam through sparger nozzles into the fluid filled components of the receiver 10 may be performed in lieu of electric heaters.

Each of the temperature sensors 92-94 continuously communicates respective temperature information 118-122 to the processor 102 of the controller 96. Upon a determination by the processor 102 that the preselected temperature threshold 106 is no longer met, the processor 102 may communicate a command to the alternate heat source 90 to deactivate the alternate heat source 90. When using a variable heat source 90, the command may vary the intensity or level of heat being applied to the heat transfer fluid 98.

The controller 96 may be operatively coupled to the structure of the solar receiver 10, may be in a remote operations center, or the like. Preprogrammed heating operations, i.e., scheduled activations of the alternate heat source 90, may also be implemented to automatically occur at specified intervals in addition to activations based upon temperature information 118-122 collected by the sensors 92-94. For example, the memory 104 may store software instructions that when executed by the processor 102, automatically activate the alternate heat source 90 during selected hours of the day, e.g., night, early morning, during startup, etc. Such a control system as described herein is equally applicable to freeze protection for solar receivers with some alternate means of steam separation such as a solar receiver with a steam drum.

As described above, the alternate heat source 90 may be placed upon or within the downcomer 17, vertical separator 16, lower header 88, supply pipe 24, or tube panel 12, 14. It is also contemplated that more than one alternate heat source may be located upon any combination of these locations. In this regard, the controller 96 can be used to control multiple alternate heat sources.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A steam/water solar receiver, comprising:
   at least one tube panel comprising a plurality of vertical tubes for conveying a heat transfer fluid, wherein the tubes are interconnected by at least one upper header and at least one lower header;
   a steam separation device fluidly connected to the at least one upper header of the at least one tube panel;
   a downcomer fluidly coupled to the steam separation device and the at least one lower header of the at least one tube panel; and
   at least one alternate heat source selectively operative on a heat transfer fluid within the solar receiver, wherein the at least one alternate heat source is in at least one of the following positions: contacting an outside portion of the at least one lower header or within the at least one lower header; contacting an outside portion of the downcomer or within the downcomer; contacting an outside portion of at least one of the tubes; or contacting an outside portion of the steam separation device or within the steam separation device.

2. The steam/water solar receiver of claim 1, wherein the at least one alternate heat source is positioned so as to contact an outside portion of the steam separation device, or is positioned within the steam separation device.

3. The steam/water solar receiver of claim 1, wherein the at least one alternate heat source is positioned so as to contact an outside portion of the at least one lower header, or is positioned within the at least one lower header.

4. A solar receiver comprising:
   at least one tube panel comprising a plurality of vertical loose tangent tubes for conveying a heat transfer fluid, wherein the tubes are interconnected by at least one upper header and at least one lower header;
   a vertical separator;
   a downcomer in fluid communication with the vertical separator;
   at least one riser fluidly connecting the at least one upper header and the vertical separator;
   at least one supply pipe fluidly connecting the at least one lower header and the downcomer; and
   at least one alternate heat source in contact with the downcomer and configured to heat the associated heat transfer fluid contained in the solar receiver so as to induce natural circulation of the heat transfer fluid in the solar receiver.

5. A solar energy generation system, comprising:
   a solar receiver comprising a plurality of fluid-filled components;
   at least one alternate heat source in contact with at least a portion of at least one of the fluid-filled components of the solar receiver;
   a controller in communication with the at least one alternate heat source, the controller configured to control operations of the alternate heat source;
   at least one fluid temperature sensor in data communication with the controller, the at least one heat transfer fluid temperature sensor configured to detect a temperature of an associated heat transfer fluid within the solar receiver;
   at least one ambient air temperature sensor in data communication with the controller, the at least one ambient air temperature sensor configured to detect a temperature of ambient air surrounding the solar energy generation system; and
   at least one component temperature sensor configured to detect a temperature of at least one component of the solar receiver.

6. The solar receiver of claim 1, wherein the at least one alternate heat source is configured to heat the heat transfer fluid so as to induce a natural circulation flow through the solar receiver.

7. The solar receiver of claim 1, wherein the at least one alternate heat source is positioned so as to contact an outside portion of the at least one lower header or is positioned within the at least one lower header.

8. The solar receiver of claim 1, wherein the at least one alternate heat source is positioned so as to contact an outside portion of the downcomer or is positioned within the downcomer.

9. The solar receiver of claim 1, wherein the at least one alternate heat source is an electric band heater or a steam sparger.

10. The solar receiver of claim 1, further comprising at least one temperature sensor for sensing a temperature of the heat transfer fluid.

11. The solar receiver of claim 10, further comprising a controller configured to control the at least one alternate heat source.

12. The solar receiver of claim 11, wherein the controller is configured to receive the sensed temperature of the heat transfer fluid and selectively operate the at least one alternate heat source in response thereto.

13. The solar receiver of claim 12, wherein the controller is configured to compare the sensed temperature to a preselected threshold temperature, such that the at least one alternate heat source is activated upon the sensed temperature meeting the preselected threshold temperature.

14. The solar receiver of claim 1, wherein the at least one alternate heat source is positioned to contact an outside portion of at least one of the tubes.

15. The solar receiver of claim 1, wherein the at least one alternate heat source is positioned so as to contact an outside portion of a supply pipe fluidly connecting the lower header with the downcomer, or is positioned within the supply pipe.

16. The solar receiver of claim 1, wherein the steam separation device is a steam drum.

17. The solar receiver of claim 1, wherein the steam separation device is a vertical separator.

18. The solar receiver of claim 17, wherein the at least one alternate heat source is positioned so as to contact an outside portion of a base of the vertical separator, or is positioned within the base of the vertical separator.

19. The solar receiver of claim 1, further comprising an isolation valve in the solar receiver above a level at which the steam separation device is fluidly connected to the upper header.

20. The solar receiver of 4, further comprising at least one temperature sensor in contact with the heat transfer fluid, ambient air surrounding the solar receiver, the vertical separator, the downcomer, the at least one tube panel, the at least one riser, or the at least one supply pipe.

21. The solar receiver of claim 20, further comprising a controller including one or more processors in communication with the at least one temperature sensor and the alternate heat source, the controller configured to:
   receive temperature information from the at least one temperature sensor, and
   operate the at least one alternate heat source in response to received temperature information.

22. The solar receiver of claim 21, wherein the controller is further configured to compare received temperature information to at least one preselected threshold temperature, and wherein the at least one alternate heat source is activated in response to an output of such comparison.

23. The solar receiver of claim 4, wherein the at least one alternate heat source is a variable heat source or a constant heat source.

24. The solar receiver of claim 4, wherein the at least one alternate heat source is configured to apply a selected amount of thermal energy to the associated heat transfer fluid so as to induce circulation of the heat transfer fluid in the solar receiver.

25. The solar receiver of claim 4, wherein the at least one alternate heat source is in contact with the downcomer such that the induced circulation is a natural circulation of the associated heat transfer fluid.

26. The solar receiver of claim 4, further comprising a circulation pump fluidly coupled to the downcomer, the at least one lower header, or the at least one upper header.

27. The solar energy generation system of claim 5, wherein the controller is configured to receive fluid temperature information from the at least one fluid temperature sensor, ambient air temperature information from the at least one ambient air temperature sensor, and component temperature information from the at least one component temperature sensor.

28. The solar energy generation system of claim 27, wherein the controller is configured to compare at least one of the received temperature information to a preselected threshold temperature, and wherein the controller activates the at least one alternate heat source in accordance with a result of the comparison.

29. The solar energy generation system of claim 28, wherein the plurality of fluid-filled components include a vertical separator, at least one riser, at least one evaporator tube panel, at least one supply, and a downcomer.

30. The solar energy generation system of claim 29, further comprising a circulation pump configured to circulate the associated heat transfer fluid in the solar energy generation system.

31. The solar energy generation system of claim 30, wherein the controller is operative to activate the circulation pump in accordance with a result of the threshold temperature comparison.

32. The solar energy generation system of claim 31, wherein the solar receiver includes an isolation valve in piping above a water level of the vertical separator.

\* \* \* \* \*